US012793555B2

(12) United States Patent
Subramaniyan et al.

(10) Patent No.: US 12,793,555 B2
(45) Date of Patent: Nov. 10, 2026

(54) METHOD AND SYSTEM FOR GENERATING A HEADING INTERCEPT ADVISORY

(71) Applicant: HONEYWELL INTERNATIONAL INC., Charlotte, NC (US)

(72) Inventors: Muthusankar Subramaniyan, Brno (CZ); Gang He, Morris Plains, NJ (US); Stanislav Foltan, Brno (CZ)

(73) Assignee: HONEYWELL AEROSPACE US LLC, Phoenix, AZ (US)

( * ) Notice: Subject to any disclaimer, the term of this patent is extended or adjusted under 35 U.S.C. 154(b) by 230 days.

(21) Appl. No.: 18/499,737

(22) Filed: Nov. 1, 2023

(65) Prior Publication Data

US 2025/0087098 A1 Mar. 13, 2025

(30) Foreign Application Priority Data

Sep. 13, 2023 (IN) ............................. 202311061627

(51) Int. Cl.
*G08G 5/21* (2025.01)
*G08G 5/32* (2025.01)

(52) U.S. Cl.
CPC ................. *G08G 5/21* (2025.01); *G08G 5/32* (2025.01)

(58) Field of Classification Search
None
See application file for complete search history.

(56) References Cited

U.S. PATENT DOCUMENTS

| | | | |
|---|---|---|---|
| 6,922,631 | B1 | 7/2005 | Dwyer et al. |
| 8,352,102 | B2 | 1/2013 | Deker et al. |
| 9,530,321 | B2 | 12/2016 | Deker et al. |
| 9,536,434 | B2 | 1/2017 | Sebastien et al. |
| 9,922,570 | B2 | 3/2018 | Stark |
| 11,270,593 | B2 | 3/2022 | Molnar et al. |
| 2008/0294335 | A1 * | 11/2008 | Bitar ........................ G08G 5/34 701/467 |
| 2009/0076721 | A1 | 3/2009 | Coulmeau et al. |
| 2010/0100308 | A1 | 4/2010 | Coulmeau et al. |
| 2010/0324812 | A1 | 12/2010 | Sacl et al. |
| 2015/0260525 | A1 * | 9/2015 | Parthasarathy .......... G08G 5/21 701/538 |
| 2017/0138739 | A1 * | 5/2017 | Block .................... G01C 23/00 |
| 2018/0276999 | A1 * | 9/2018 | Dacre-Wright .......... G08G 5/55 |
| 2019/0122569 | A1 * | 4/2019 | Villele ................... B64D 45/04 |
| 2020/0273349 | A1 * | 8/2020 | De Villele ............... G08G 5/54 |
| 2022/0307853 | A1 * | 9/2022 | Davis ..................... B64D 43/02 |

(Continued)

*Primary Examiner* — Madison R. Inserra
(74) *Attorney, Agent, or Firm* — Ingrassia Fisher & Lorenz

(57) ABSTRACT

A method and system for optimizing an aircraft heading for an intercept of a flight plan has been developed. The method includes activating a flight plan intercept advisory function on a flight management system (FMS) for the aircraft when an aircraft deviates from the active flight plan of the aircraft. The flight plan intercept advisory function identifies intercept points of the active flight plan that is based on an aircraft heading that is selected by a pilot of the aircraft. The advisory function calculates predicted compliance with flight performance and operational parameters of the aircraft at each intercept point. The predicted compliance of flight performance and operational parameters of the aircraft at each intercept point are then displayed to the pilot of the aircraft.

17 Claims, 9 Drawing Sheets

700

706

702

(56) References Cited

U.S. PATENT DOCUMENTS

| | | | | |
|---|---|---|---|---|
| 2023/0123233 | A1* | 4/2023 | Urien | G08G 5/21 701/415 |
| 2023/0274649 | A1* | 8/2023 | Dewas | G08G 5/21 701/14 |

* cited by examiner

300

400

500

600

700

800

METHOD AND SYSTEM FOR GENERATING A HEADING INTERCEPT ADVISORY

CROSS REFERENCE TO RELATED APPLICATION

The present application claims benefit of prior filed India Provisional Patent Application No. 202311061627, filed Sep. 13, 1923, which is hereby incorporated by reference herein in its entirety.

TECHNICAL FIELD

The present invention generally relates to aircraft operations, and more particularly relates to generation of a heading intercept advisory for a flight plan of an aircraft.

BACKGROUND

Aircraft flight management system performs numerous computations within a flight plan based on waypoints picked up from various navigation databases. The predictions for intercepts to resume a flight path are displayed between waypoint-to-waypoint or leg-to-leg along the flight plan path. However, a pilot often needs to see flight prediction data for an intercept for a point which is between waypoints of the flight plan. Hence, there is a need for a method and system for generating a heading intercept advisory.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for optimizing an aircraft heading for an intercept of a flight plan. The method comprises: activating a flight plan intercept advisory function on a flight management system (FMS) for an aircraft when the aircraft deviates from an active flight plan, or when aircraft is commanded to fly a heading direction deviating from the current flight plan path, where the flight plan intercept advisory function, identifies at least one intercept point of the active flight plan that is based on an aircraft heading that is selected by a pilot of the aircraft, and calculates predicted compliance with flight performance and operational parameters of the aircraft at each intercept point; and displaying the predicted compliance of flight performance and operational parameters of the aircraft at each intercept point to the pilot of the aircraft.

A system is provided for optimizing an aircraft heading for an intercept of a flight plan. The system comprises: a flight management system (FMS) for an aircraft that contains a flight plan intercept advisory function that is activated when the aircraft deviates from an active flight plan for an aircraft, where the flight plan intercept advisory function, identifies at least one intercept point of the active flight plan that is based on an aircraft heading that is selected by a pilot of the aircraft, and calculates predicted compliance with flight performance and operational parameters of the aircraft at each intercept point; and a display that shows the predicted compliance of flight performance and operational parameters of the aircraft at each intercept point to the pilot of the aircraft.

Furthermore, other desirable features and characteristics of the various embodiments will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method and system for optimizing an aircraft heading for an intercept of a flight plan has been developed. The method includes activating a flight plan intercept advisory function on a flight management system (FMS) for the aircraft when an aircraft deviates from the active flight plan of the aircraft. In other examples, the aircraft is currently on the flight plan and is vectored by air traffic control (ATC) to certain heading directions. The flight plan intercept advisory function identifies intercept points of the active flight plan that is based on an aircraft heading that is selected by a pilot of the aircraft. The advisory function calculates predicted compliance with flight performance and operational parameters of the aircraft at each intercept point. The predicted compliance of flight performance and operational parameters of the aircraft at each intercept point are then displayed to the pilot of the aircraft. When no intercept points are identified based on the current heading direction, the advisory function may prompt pilots with available intercept heading directions and range which allows the pilot to rejoin the flight plan upon a request to the ATC.

Figure 1:
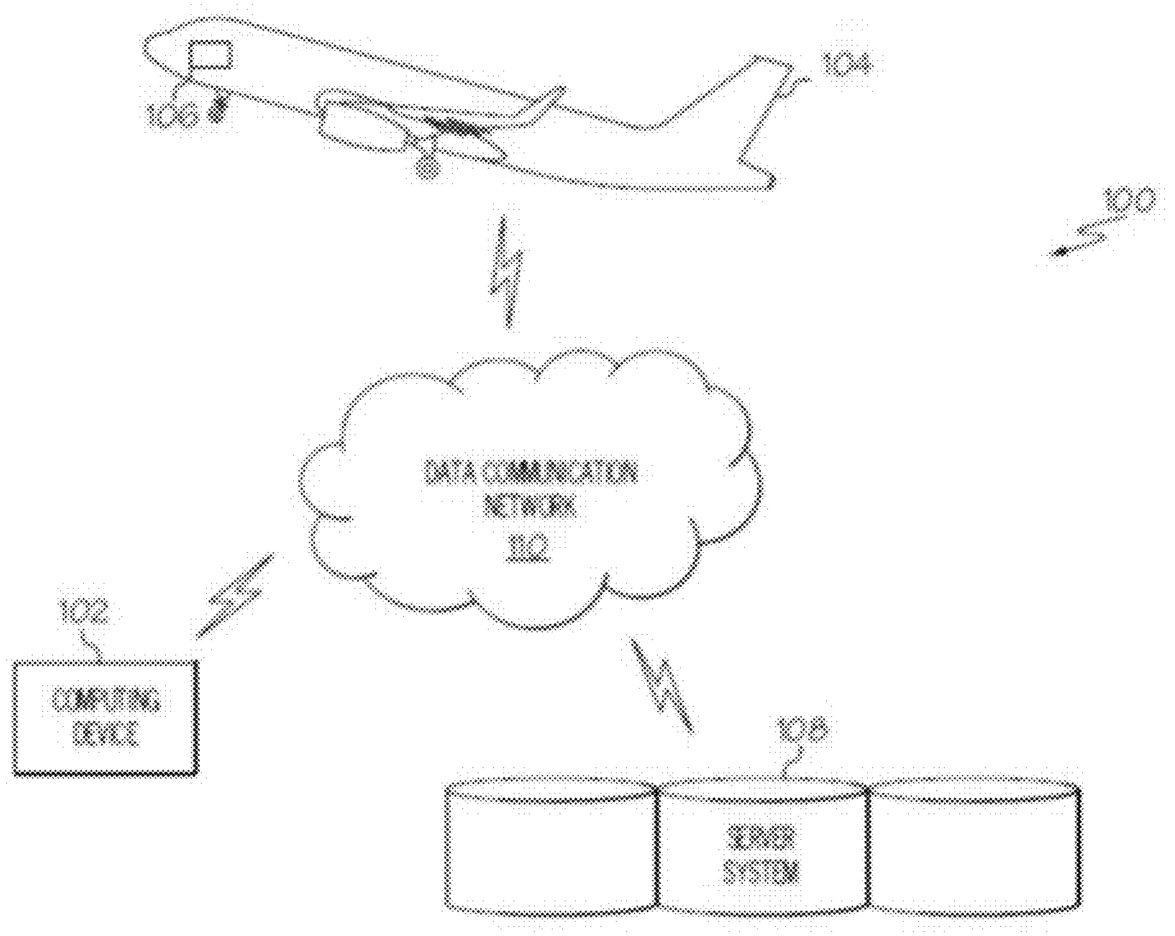
FIG. 1 shows a diagram of aircraft computer system in accordance with the disclosed embodiments.

Turning now to the figures, FIG. 1 is a diagram of aircraft computer system 100, in accordance with the disclosed embodiments. The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing Electronic Flight Bag (EFB) applications. In other embodiments, the computing device 102 may be implemented using a computer system onboard the aircraft 104.

The aircraft 104 may be implemented as an airplane, helicopter, spacecraft, hovercraft, or the like. The one or more avionics systems 106 may include a Flight Management System (FMS), navigation devices, weather detection devices, radar devices, communication devices, brake systems, and/or any other electronic system or avionics system used to operate the aircraft 104. Data obtained from the one or more avionics systems 106 may include, without limitation: flight data, aircraft heading, aircraft speed, aircraft position, altitude, descent rate, position of air spaces surrounding a current flight plan, activity of air spaces surrounding a current flight plan, energy assessment of the aircraft or the like.

The FMS, as is generally known, is a specialized computer that automates a variety of in-flight tasks such as in-flight management of the flight plan. Using various sensors such as global positioning system (GPS), the FMS determines the aircraft's position and guides the aircraft along its flight plan using its navigation database. From the cockpit, the FMS is normally controlled through a visual display device such as a control display unit (CDU) which incorporates a small screen, a keyboard or a touchscreen. The FMS displays the flight plan and other critical flight data to the aircrew during operation.

The FMS may have a built-in electronic memory system that contains a navigation database. The navigation database contains elements used for constructing a flight plan. In some embodiments, the navigation database may be separate from the FMS and located onboard the aircraft while in other embodiments the navigation database may be located on the ground and relevant data provided to the FMS via a communications link with a ground station. The navigation database used by the FMS may typically include: waypoints/intersections; airways; radio navigation aids/navigation beacons; airports; runway; standard instrument departure (SID) information; standard terminal arrival (STAR) information; holding patterns; and instrument approach procedures. Additionally, other waypoints may also be manually defined by pilots along the route.

The flight plan is generally determined on the ground before departure by either the pilot or a dispatcher for the owner of the aircraft. It may be manually entered into the FMS or selected from a library of common routes. In other embodiments the flight plan may be loaded via a communications data link from an airline dispatch center. During preflight planning, additional relevant aircraft performance data may be entered including information such as: gross aircraft weight; fuel weight and the center of gravity of the aircraft. The aircrew may use the FMS to modify the flight plan before takeoff or even while in flight for variety of reasons. Such changes may be entered via the CDU. Once in flight, the principal task of the FMS is to accurately monitor the aircraft's position. This may use a GPS, a VHF omni-directional range (VOR) system, or other similar sensor in order to determine and validate the aircraft's exact position. The FMS constantly cross checks among various sensors to determine the aircraft's position with accuracy.

Additionally, the FMS may be used to perform advanced vertical navigation (VNAV) functions. The purpose of VNAV is to predict and optimize the vertical path of the aircraft. The FMS provides guidance that includes control of the pitch axis and of the throttle of the aircraft. In order to accomplish these tasks, the FMS has detailed flight and engine model data of the aircraft. Using this information, the FMS may build a predicted vertical descent path for the aircraft along with an aircraft energy assessment. A correct and accurate implementation of VNAV has significant advantages in fuel savings and on-time efficiency.

The server system 108 may include any number of application servers, and each server may be implemented using any suitable computer. In some embodiments, the server system 108 includes one or more dedicated computers. In some embodiments, the server system 108 includes one or more computers carrying out other functionality in addition to server operations. The server system 108 may store and provide any type of data in various databases. Such data may include, without limitation: flight plan data, aircraft parameters, avionics data and associated user actions, and other data compatible with the computing device 200.

The computing device 102 is usually located onboard the aircraft 104, and the computing device 102 communicates with the one or more avionics systems 106 via wired and/or wireless communication connection. The computing device 102 and the server system 108 may both be located onboard the aircraft 104. In other embodiments, the computing device 102 and the server system 108 may be disparately located, and the computing device 102 communicates with the server system 108 via the data communication network 110 and/or via communication mechanisms onboard the aircraft 104.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth™) protocol. For the sake of brevity, conventional techniques related to data transmission, signaling, network control, and other functional aspects of the systems (and the individual operating components of the systems) may not be described in detail herein.

Figure 2:
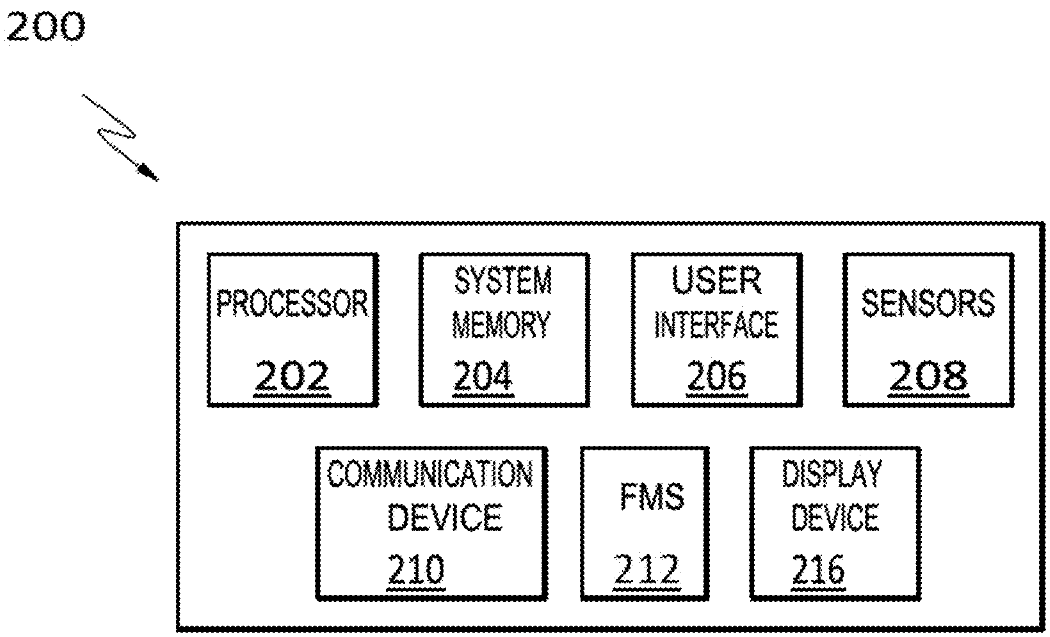
FIG. 2 shows a functional block diagram of a computing device in accordance with the disclosed embodiments.

FIG. 2 is a functional block diagram of a computing device 200, in accordance with the disclosed embodiments. It should be noted that the computing device 200 can be implemented with the computing device 102 depicted in FIG. 1. In this regard, the computing device 200 shows certain elements and components of the computing device 102 in more detail.

The computing device 200 generally includes, without limitation: a processor 202; system memory 204; a user interface 206; a plurality of sensors 208; a communication device 210; an FMS 212; and a display device 216. These elements and features of the computing device 200 may be operatively associated with one another, coupled to one another, or otherwise configured to cooperate with one another as needed to support the desired functionality. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that are described in more detail below.

The processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 202 may be realized as one or more microprocessors, controllers, microcontrollers, or state machines. Moreover, the processor 202 may be implemented as a combination of computing devices, e.g., a combination of digital signal processors and microprocessors, a plurality of microprocessors, one or more microprocessors in conjunction with a digital signal processor core, or any other such configuration.

The processor 202 is communicatively coupled to the system memory 204. The system memory 204 is configured to store any obtained or generated data associated with generating alerts to redirect user attention from the computing device 200 to a critical or high-priority flight situation. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the processor 202 such that the processor 202 can read information from, and write information to, the system memory 204. In the alternative, the system memory 204 may be integral to the processor 202. As an example, the processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to provide flight data parameters during the operation of electronic flight bag (EFB) applications, as described herein.

In certain embodiments, the user interface 206 may include or cooperate with various features to allow a user to interact with the computing device 200 via graphical elements rendered on a display element (e.g., the display device 216). Accordingly, the user interface 206 may initiate the creation, maintenance, and presentation of a graphical user interface (GUI). In certain embodiments, the display device 216 implements touch-sensitive technology for purposes of interacting with the GUI. Thus, a user can manipulate the GUI by moving a cursor symbol rendered on the display device 216, or by physically interacting with the display device 216 itself for recognition and interpretation, via the user interface 206.

The plurality of sensors 208 is configured to obtain data associated with active use of the computing device 200, and may include, without limitation: touchscreen sensors, accelerometers, gyroscopes, or the like. Some embodiments of the computing device 200 may include one particular type of sensor, and some embodiments may include a combination of different types of sensors. Generally, the plurality of sensors 208 provides data indicating whether the computing device 200 is currently being used. Touchscreen sensors may provide output affirming that the user is currently making physical contact with the touchscreen (e.g., a user interface 206 and/or display device 216 of the computing device 200), indicating active use of the computing device. Accelerometers and/or gyroscopes may provide output affirming that the computing device 200 is in motion, indicating active use of the computing device 200.

The communication device 210 is suitably configured to communicate data between the computing device 200 and one or more remote servers and one or more avionics systems onboard an aircraft. The communication device 210 may transmit and receive communications over a wireless local area network (WLAN), the Internet, a satellite uplink/downlink, a cellular network, a broadband network, a wide area network, or the like. As described in more detail below, data received by the communication device 210 may include, without limitation: avionics systems data and aircraft parameters (e.g., a heading for the aircraft, aircraft speed, altitude, aircraft position, ascent rate, descent rate, a current flight plan, a position of air spaces around a current flight plan, and activity of the air spaces around a current flight plan), and other data compatible with the computing device 200. Data provided by the communication device 210 may include, without limitation, requests for avionics systems data, alerts and associated detail for display via an aircraft onboard display, and the like.

The display device 216 is configured to display various icons, text, and/or graphical elements associated with alerts related to situations requiring user attention, wherein the situations are associated with a device or system that is separate and distinct from the computing device 200. In an exemplary embodiment, the display device 216 and the user interface 206 are communicatively coupled to the processor 202. The processor 202, the user interface 206, and the display device 216 are cooperatively configured to display, render, or otherwise convey one or more graphical representations or images associated with high-priority or critical flight situation alerts on the display device 216, as described in greater detail below. In an exemplary embodiment, the display device 216 is realized as an electronic display configured to graphically display critical flight situation alerts and associated detail, as described herein. In some embodiments, the computing device 200 is an integrated computer system onboard an aircraft, and the display device 216 is located within a cockpit of the aircraft and is thus implemented as an aircraft display. In other embodiments, the display device 216 is implemented as a display screen of a standalone, personal computing device (e.g., laptop computer, tablet computer). It will be appreciated that although the display device 216 may be implemented using a single display, certain embodiments may use additional displays (i.e., a plurality of displays) to accomplish the functionality of the display device 216 described herein.

Figure 3:
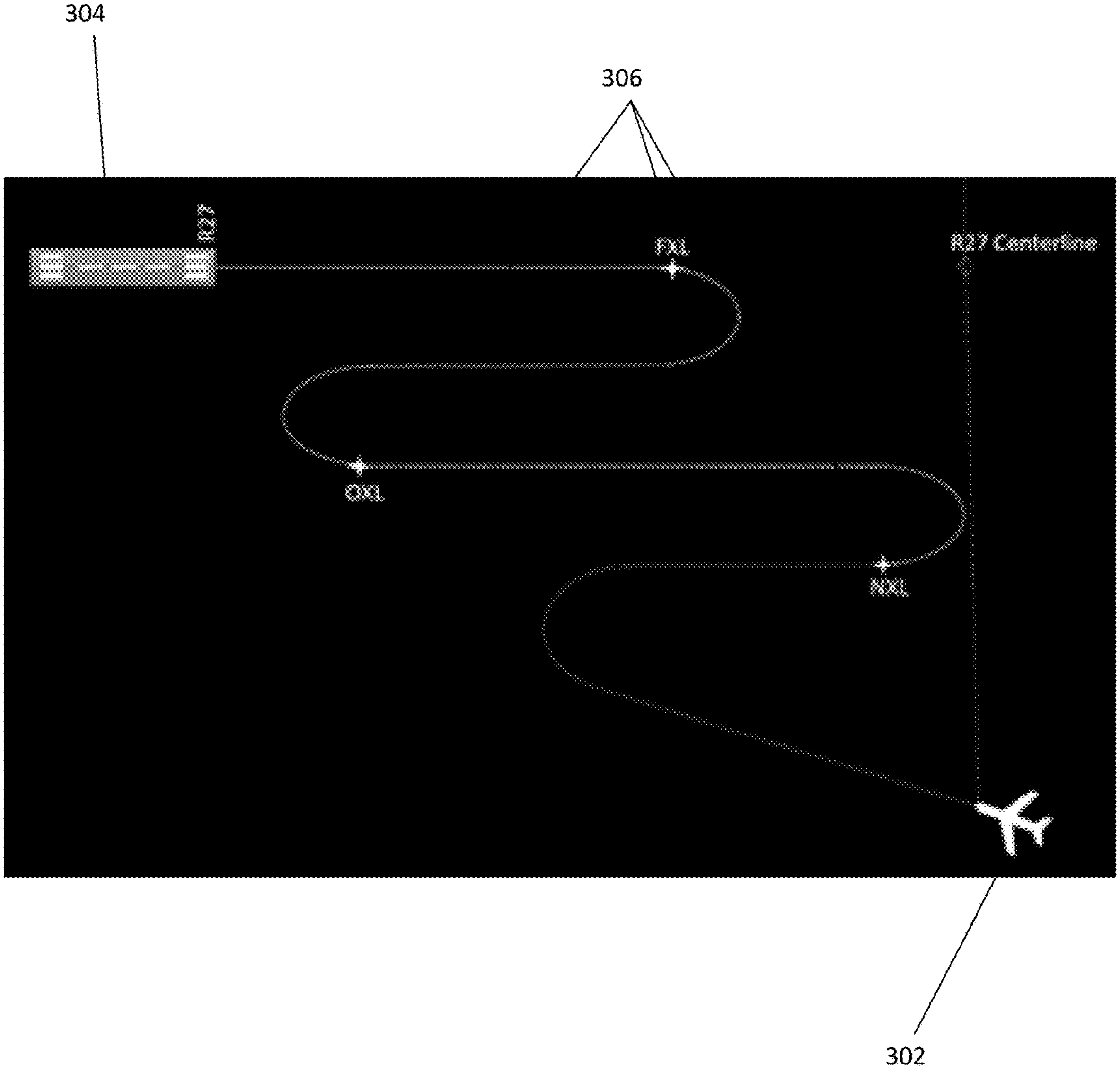
FIG. 3 shows a display of an active flight plan for an aircraft in accordance with the disclosed embodiments.

Turning now to FIG. 3, a display 300 is shown of an active flight plan for an aircraft 302 in accordance with the disclosed embodiments. In this example, the flight plan for the aircraft 302 has a destination of runway "R27" 304 while passing through various waypoints 306 labeled "NXL", "OXL" and "FXL". The segments of the flight plan between the waypoints are called "legs". In typical aircraft operations, air traffic control (ATC) may vector an airplane away from originally planned flight path due to traffic, weather conditions, etc. The pilot may rejoin the planned path at a point in-between when allowed. However, the operational flight parameters such as that energy state of vector-to-rejoin the planned path information relative to intended approach and landing operations needs to be calculated.

In present embodiments, the pilot dials in a heading/track interceptor line so that it intercepts a point in a leg segment. The system will calculate and display on a pilot-configured FMS the selected intercept data. The intercept data shown includes: the aircraft energy state (typically listed as "stable" or "unstable"); speed; altitude, distance to go (DTG) to a selected point such a waypoint or destination; fuel remaining; aircraft constraints; etc.). This directly saves pilots time and enables quick situational awareness.

When the aircraft is operating in a heading/track intercept mode, the heading intercept line will be used to show FMS predictions whenever pilot dials the heading knob over the active flight plan with an intercept. A dynamic computation is performed to periodically evaluate aircraft operation parameters (e.g., energy state along the path, speed, altitude, deviation, etc.). Graphic indications are generated and display from intercept point and subsequent path in 2D/3D/4D reflecting the aircraft parameter state relevant to the current approach and landing operations. There may be one or more intercepts to the selected heading and all intercepts position will show respective FMS predictions. In such embodiments, the intercept advisory will show combinations of advisories. Favorable and unfavorable paths and conditions, as characterized by the aircraft parameters relative to the approach and landing operations may also be displayed. Advisories with different predictive values may be color coded (e.g., Green/Yellow/White) and/or have a varied shape of the symbol (e.g., Continuous Diamond/Dashed Diamond) to denote predictive values at the intercept point.

In some embodiments, the intercept advisory may be an add-on layer to existing aircraft systems and displays. The intercept advisory is configurable to turn-on and turn-off of various features. The intercept advisory will have sub-menus to select pilot preferred values for the features to be displayed. The pilot may have an option to select his/her preferred intercept and activate it for further navigation. Textural or graphic selection mechanisms are provided to allow pilots to select/insert/activate the favorable path selections. In other embodiments, the intercept advisory will have options to show the tolerance (e.g., in NM) to the closest active flight plan and recommend the direction of turn to have an active intercept. Also, the intercept advisory may recommend an intercept name using the PBD (Place-Bearing-Distance) principle. Also, an automated path selection and activation function for a favorable path may be used when aircraft parameters are with a preselected range.

Figure 4:
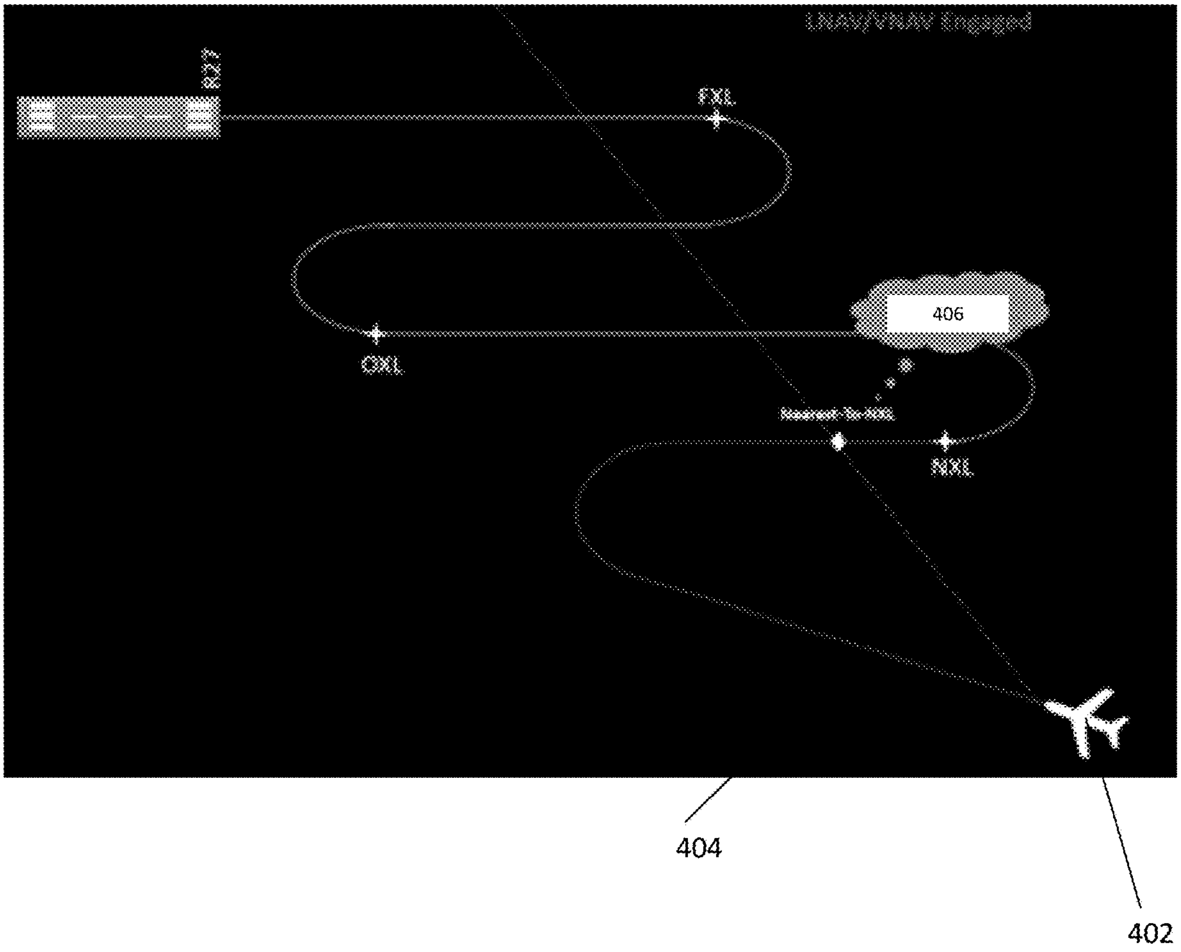
FIG. 4 shows a display of a nearest to waypoint intercept of an active flight plan for an aircraft in accordance with the disclosed embodiments.
Figure 5:
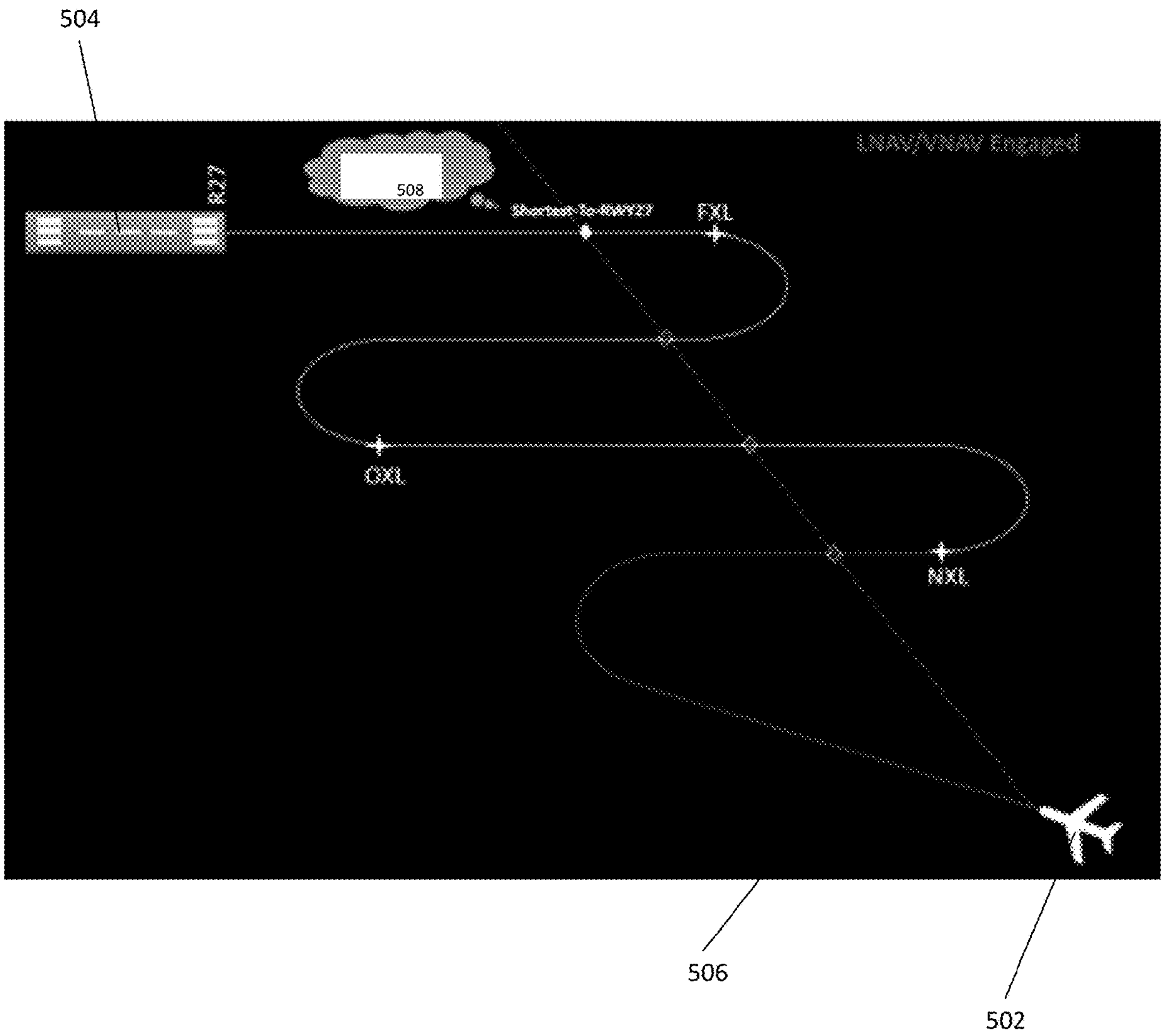
FIG. 5 shows a display of a nearest to destination intercept of an active flight plan for an aircraft in accordance with the disclosed embodiments.
Figure 6:
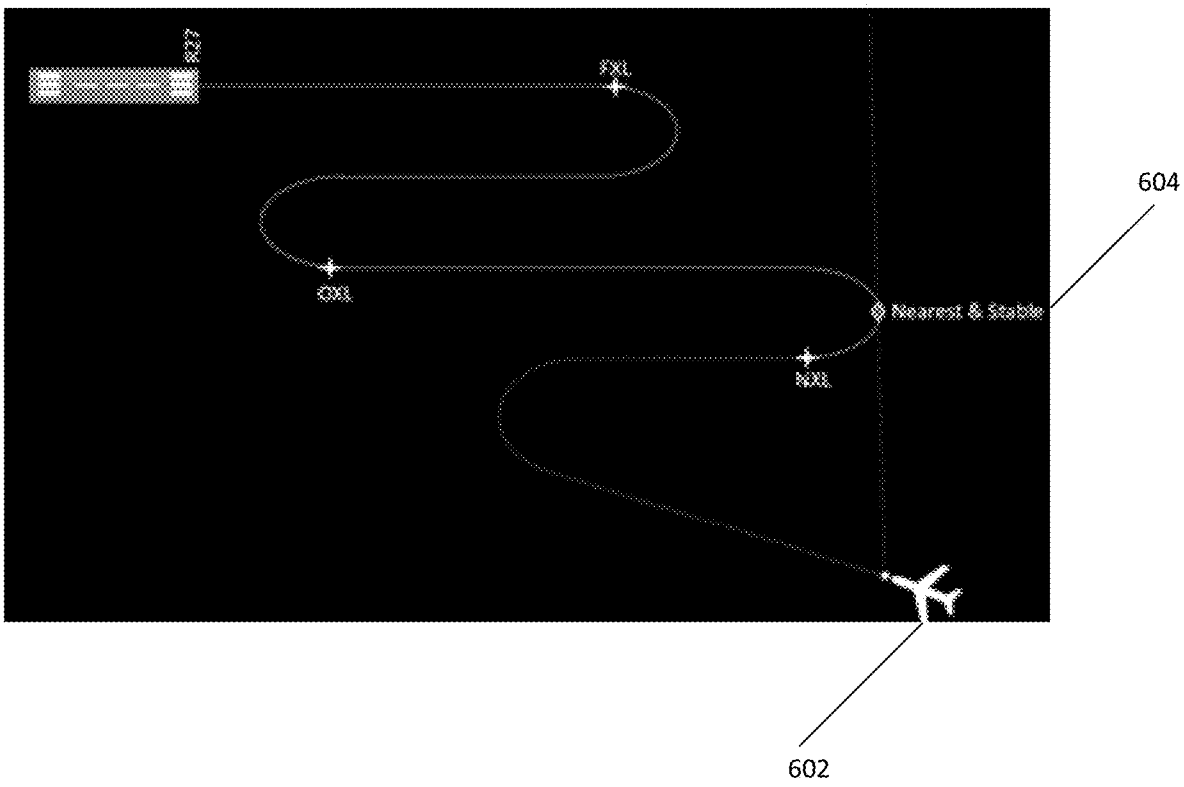
FIG. 6 shows a display of a nearest and stable intercept of an active flight plan for an aircraft in accordance with the disclosed embodiments.

In the following examples, a flight plan has been constructed to an active runway with waypoints NXL, OXL, FXL and destination RWY27. The pilot is flying in fully "managed mode". In other embodiments, the pilot may be flying in "manual mode" (e.g., heading mode). The pilot dials a heading knob in such a way that it intecepts existing active flight plan. The system automatically displays specific selected attributes at the intercept points. Turning now to FIG. 4, a display 400 is shown of a nearest to waypoint intercept of an active flight plan 404 for an aircraft 402 in accordance with the disclosed embodiments. This is an example of nearest intercept to immediate next leg 406 which can be intercepted. Turning now to FIG. 5, a display 500 is shown of a nearest to destination intercept 508 of an active flight plan 506 for an aircraft 502 in accordance with the disclosed embodiments. This is an example to show an intercept point that is calculated to be the shortest distance to the destination runway R27 504. This intercept point is obtained by dailing the heading knob when this feaure is activated. Turning now to FIG. 6, a display 600 is shown of the nearest intercept that is also stable 604 of an active flight plan for an aircraft 602 in accordance with the disclosed embodiments.

Figure 7:
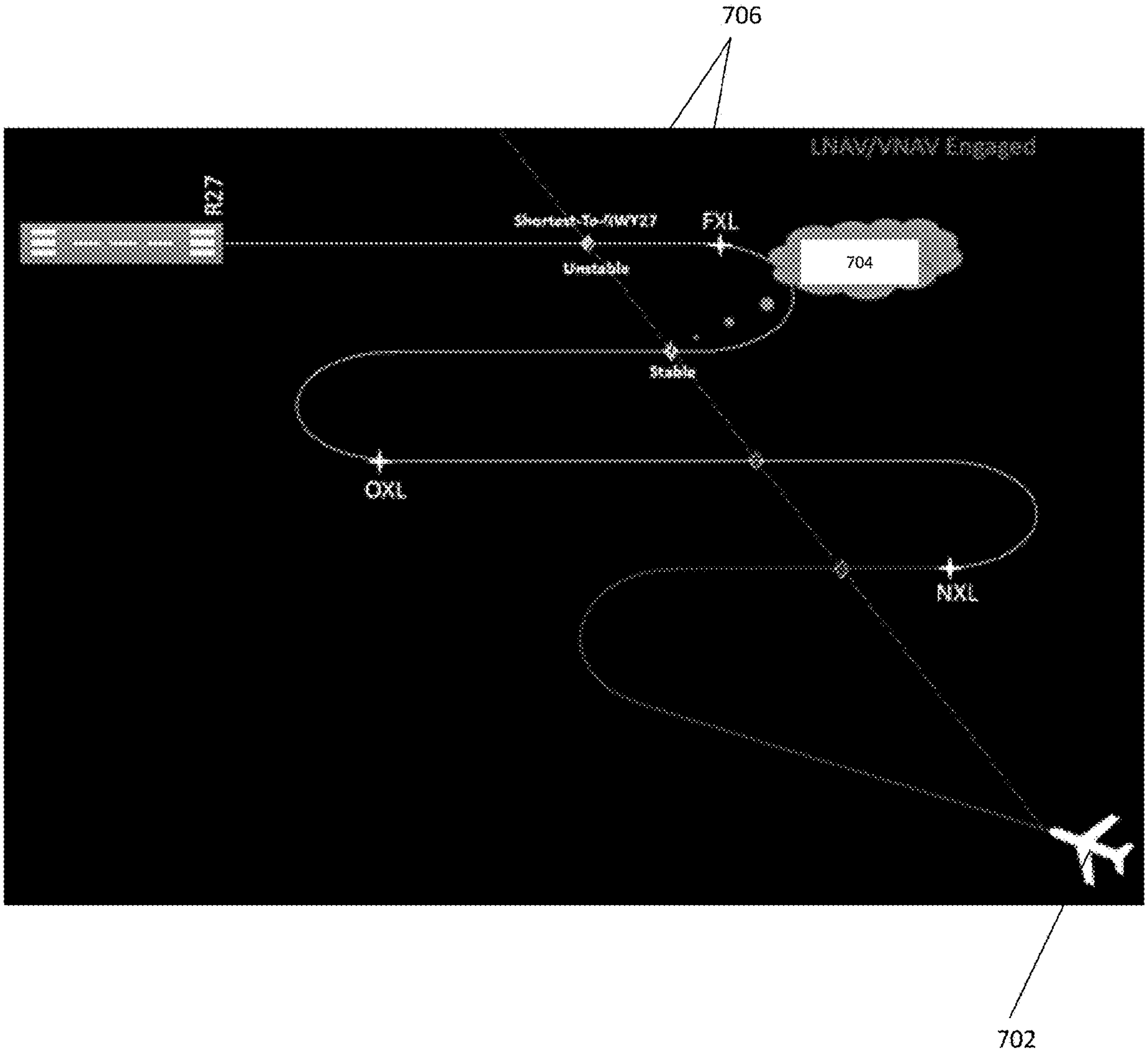
FIG. 7 shows a display of multiple waypoint intercepts of an active flight plan for an aircraft in accordance with the disclosed embodiments.
Figure 8:
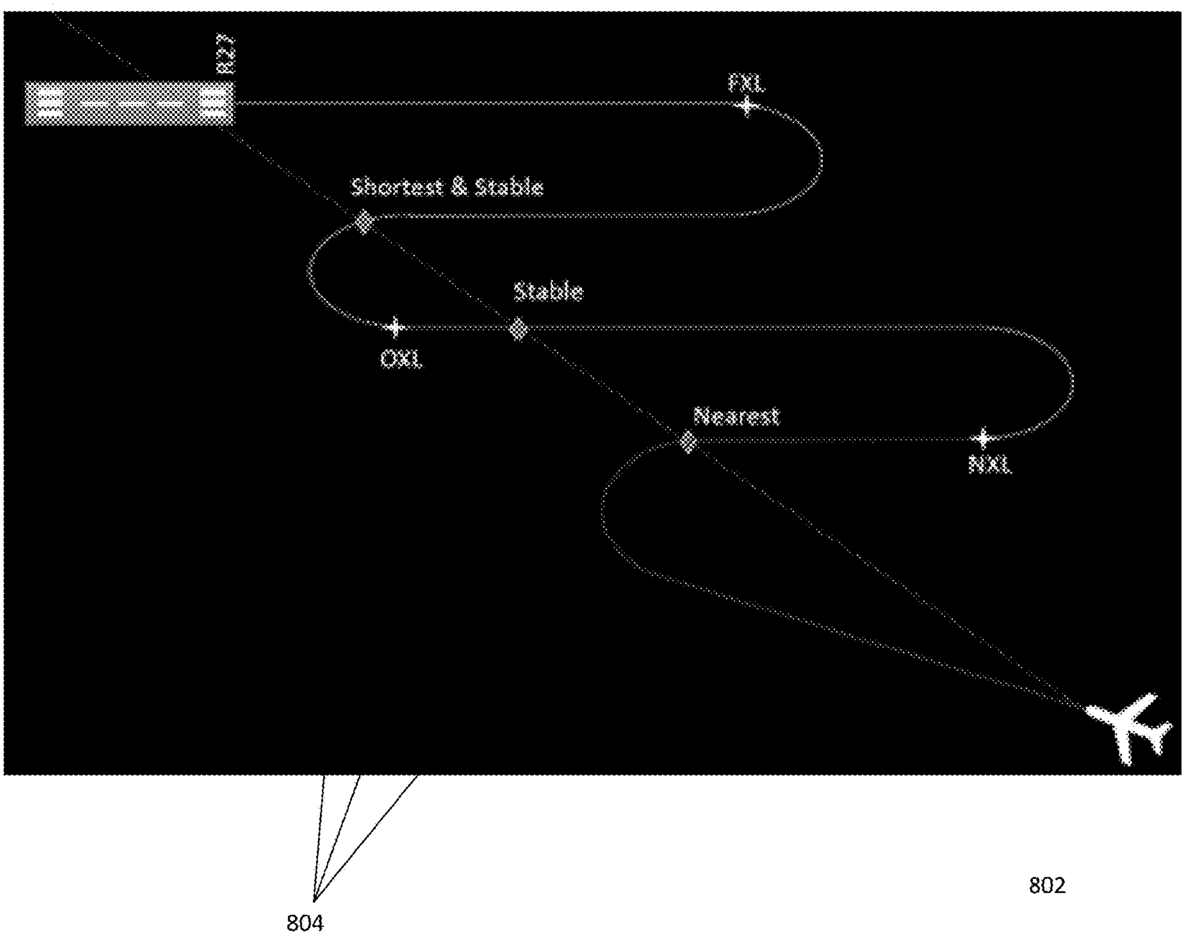
FIG. 8 shows a display of multiple waypoint intercept of an active flight plan for an aircraft in accordance with the disclosed embodiments.

Turning now to FIG. 7, a display 700 is shown of multiple waypoint intercepts 704 and 706 of an active flight plan for an aircraft 702 in accordance with the disclosed embodiments. Turning now to FIG. 8, a display 800 is shown of multiple waypoint intercepts 804 of an active flight plan for an aircraft 802 in accordance with the disclosed embodiments. In these examples, the heading intercept is used to determine FMS operational predictions (e.g., aircraft energy states at multiple places) of each of the intercept points before even flying to that location just by dialing the heading knob.

Figure 9:
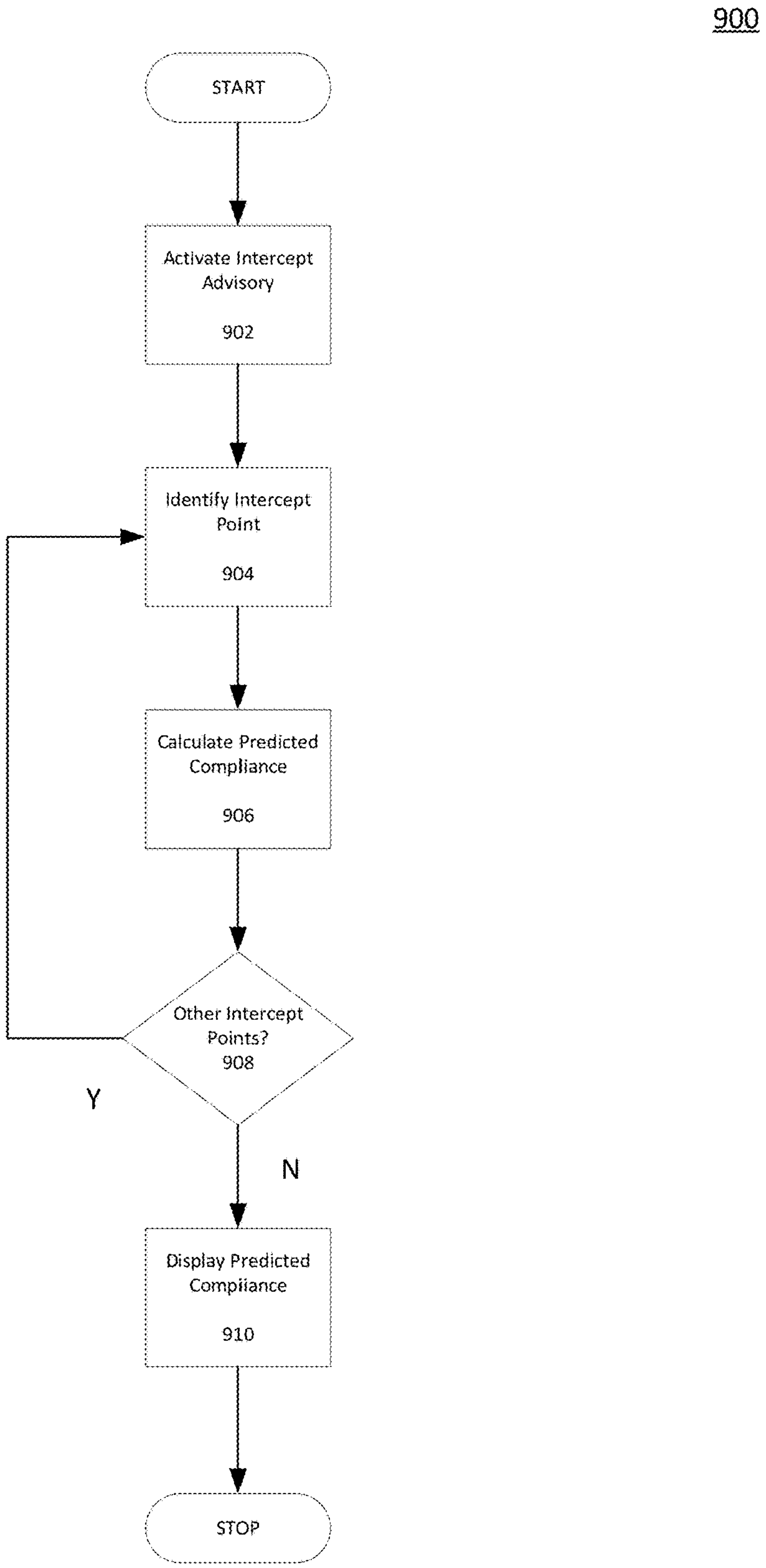
FIG. 9 shows a flowchart for optimizing an aircraft heading for an intercept of a flight plan with the disclosed embodiments.

Turning now to FIG. 9, a flowchart 900 is shown for optimizing an aircraft heading for an intercept of a flight plan with the disclosed embodiments. First, a flight plan intercept advisory function is activated 902 on a flight management system (FMS) for the aircraft when an aircraft deviates from the active flight plan of the aircraft. In some embodiments, the aircraft deviates from the active flight plan when the aircraft is operating in manual mode as opposed to a managed mode (e.g., NAV mode). The flight plan intercept advisory function identifies intercept points 904 of the active flight plan that is based on an aircraft heading that is selected by a pilot of the aircraft. The advisory function calculates predicted compliance 906 with flight performance and operational parameters of the aircraft at each intercept point. This continues 908 until all of the of the identified intercept points have their respective compliance data predicted. Once completed for every intercept point, the predicted compliance of flight performance and operational parameters of the aircraft at each point are then displayed 910 to the pilot of the aircraft.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The “computer-readable medium”, “processor-readable medium”, or “machine-readable medium” may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as “modules” in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for setting an aircraft heading for an intercept of a flight plan, comprising:
- activating, by at least one processor, a flight plan intercept advisory function on a flight management system (FMS) for an aircraft when the aircraft deviates from an active flight plan, where the flight plan intercept advisory function;
  - identifies a plurality of intercept points between waypoints of the active flight plan that is based on an aircraft heading that is selected by a pilot of the aircraft, and
  - calculates predicted compliance with flight performance and operational parameters of the aircraft at each intercept point, wherein the predicted compliance comprises an energy state and at least one of:
  - an altitude,
  - a speed,
  - fuel remaining, or
  - distance until destination;
- displaying information of the predicted compliance of flight performance and operational parameters of the aircraft at each of multiple intercept points and displayed graphically and simultaneously to the pilot of the aircraft on a single image, wherein the predicted compliance information indicates favorable intercept points arranged to be labeled with at least the text "stable" distinguished from unfavorable intercept points arranged to be labeled with at least the text "unstable" at each of the plurality of intercept points and associated with the energy state of the aircraft, and wherein the display automatically graphically indicates a deemed most favorable intercept point among the plurality of intercept points;
- automatically selecting, by at least one processor, an intercept point among the plurality of intercept points that satisfies an aircraft energy state condition with the flight plan intercept advisory function using a Place-Bearing-Distance (PBD) principle when aircraft parameters are within a preselected range; and
- automatically activating, by at least one processor, a managed flight mode and automatically controlling, by at least one processor, the flight of the aircraft in the managed flight mode to effect convergence on the automatically selected intercept point, comprising automatically adjusting a pitch and throttle of the aircraft.

2. The method of claim 1, wherein each intercept point of the plurality of intercept points is along a different leg segment of the active flight plan.

3. The method of claim 2, where multiple ones of the intercept points each are located on a different leg segment between two waypoints along the active flight plan.

4. The method of claim 1, where the predicted compliance of flight performance and operational parameters of the aircraft is categorized as stable at multiple intercept points along a straight line indicating a heading of the aircraft that crosses the active flight plan at multiple locations.

5. The method of claim 1, where the predicted compliance of flight performance and operational parameters of the aircraft is categorized as unstable at multiple intercept points along a straight line indicating a heading of the aircraft that crosses the active flight plan at multiple locations.

6. The method of claim 1, where the predicted compliance of flight performance and operational parameters of the aircraft comprises an energy state of the aircraft at each intercept point.

7. The method of claim 1, where the predicted compliance of flight performance and operational parameters of the aircraft comprises speed of the aircraft.

8. The method of claim 1, where the predicted compliance of flight performance and operational parameters of the aircraft comprises altitude of the aircraft.

9. The method of claim 1, where the predicted compliance of flight performance and operational parameters of the aircraft comprises fuel remaining for the aircraft.

10. The method of claim 1, where the predicted compliance of flight performance and operational parameters of the aircraft comprises distance until a destination of the aircraft.

11. The method of claim 1, where the predicted compliance of flight performance and operational parameters of the aircraft comprises any operational constraints of the aircraft.

12. The method of claim 1, where the display indicates the intercept point that is nearest to the aircraft.

13. The method of claim 1, where the display indicates the intercept point that is nearest to an active runway of a destination of the aircraft.

14. The method of claim 1, where the display indicates the intercept point that is nearest to a selected waypoint along the flight plan.

15. The method of claim 1, where the display comprises a graphical display in two dimensions (2D).

16. The method of claim 1, where the display comprises a graphical display in three dimensions (3D).

17. A system for setting an aircraft heading for an intercept of a flight plan, comprising:

a flight management system (FMS), operated by at least one processor, for an aircraft that contains a flight plan intercept advisory function that is activated when the aircraft deviates from an active flight plan for an aircraft, where the flight plan intercept advisory function;

identifies a plurality of intercept points between waypoints of the active flight plan that is based on an aircraft heading that is selected by a pilot of the aircraft, and calculates predicted compliance with flight performance and operational parameters of the aircraft at each intercept point, wherein the predicted compliance comprises an energy state and at least one of:

an altitude, a speed, fuel remaining, or distance until destination;

automatically selects an intercept point among the plurality of intercept points that satisfies an aircraft energy state condition when aircraft parameters are within a preselected range, wherein the flight plan intercept advisory function selects the intercept point using a Place-Bearing-Distance (PBD) principle; and automatically activates a managed flight mode and automatically controls the flight of the aircraft in the managed flight mode to effect convergence on the automatically selected intercept point, comprising automatically adjusting a pitch and throttle of the aircraft;

a display that shows information of the predicted compliance of flight performance and operational parameters of the aircraft at each of multiple intercept points and displayed graphically and simultaneously to the pilot of the aircraft on a single image, wherein the predicted compliance information indicates favorable intercept points arranged to be labeled with at least the text "stable" distinguished from unfavorable intercept points arranged to be labeled with at least the text "unstable" at each of the plurality of intercept points and associated with the energy state of the aircraft, and wherein the display automatically graphically indicates a deemed most favorable intercept point among the plurality of intercept points; and.

* * * * *